Sept. 12, 1950  J. B. ST. GERMAIN  2,522,070
LAWN AND HEDGE TRIMMER
Filed Oct. 4, 1948
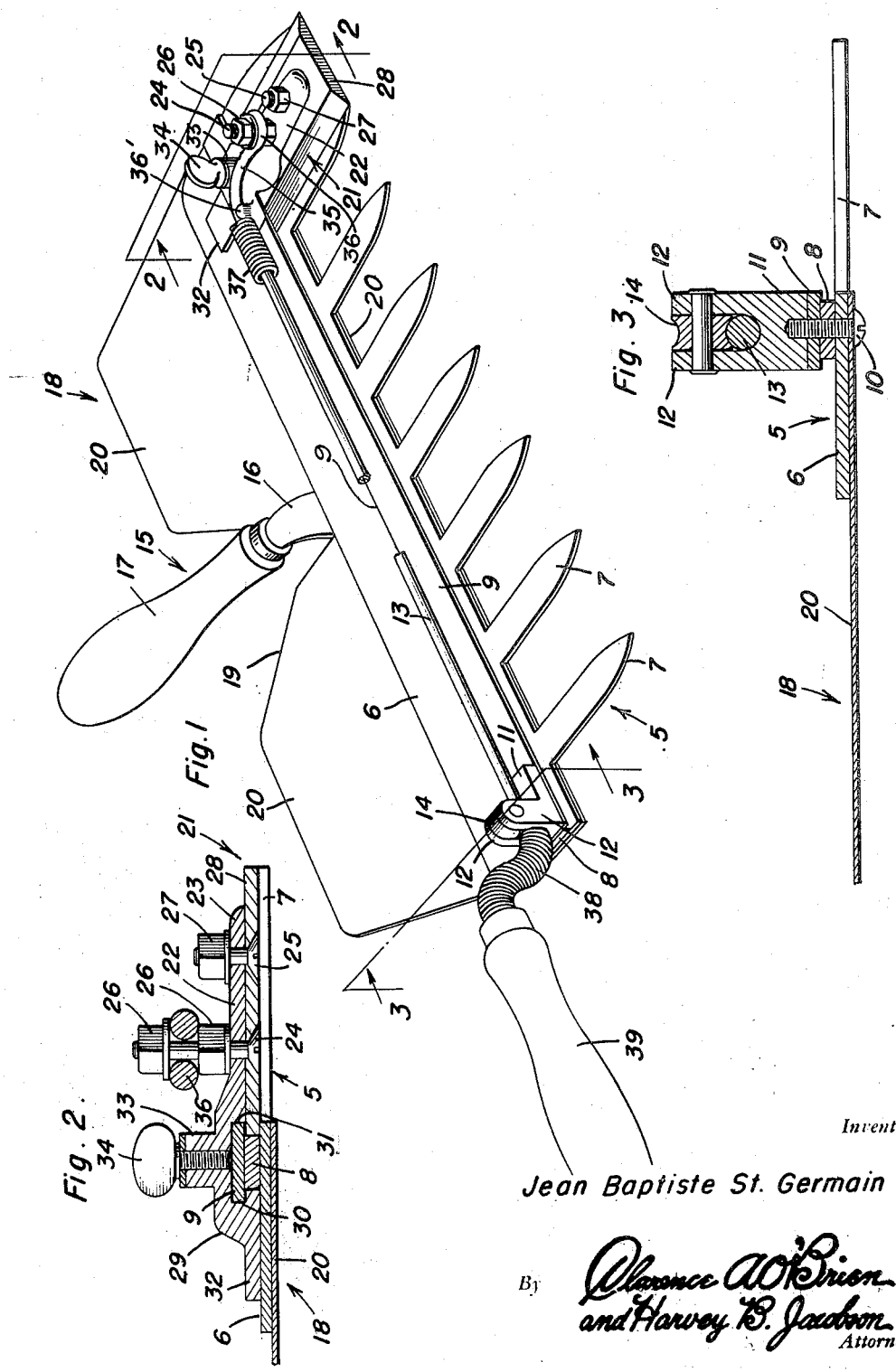
Inventor
Jean Baptiste St. Germain
By Clarence A. O'Brien
and Harvey B. Jacobson
Attorneys Patented Sept. 12, 1950

2,522,070

UNITED STATES PATENT OFFICE 2,522,070

LAWN AND HEDGE TRIMMER

Jean Baptiste St. Germain, Johnston, R. I.

Application October 4, 1948, Serial No. 52,638

1 Claim. (Cl. 30—209)

The present invention relates to manually held and actuated trimmers especially adapted for edging and trimming lawns, shaping and trimming box bushes, hedges and other evergreens and shrubbery and has more particular reference to a trimmer which is characterized by a multiple toothed cutter bar with a rigid handle, a reciprocable double-edged cutter unit coacting with the teeth of the cutter bar and also provided with a second handle, guide means on the cutter bar for the double-edge cutter unit so that by bringing the stated teeth in embracing relation with hedge twigs, the latter may be readily and cleanly severed.

It is evident from the preceding statement of the invention that I am familiar with tools and implements in the category under advisement. For example, I have knowledge of a trimmer, structurally similar to mine, disclosed in a patent to O. C. Beloin, October 21, 1930 under 1,778,995. Beloin's patented trimmer has to do with a relatively stationary blade unit or cutter bar having a plurality of spaced teeth adapted to receive projecting hedge twigs, there being a fixed guide or equivalent means attached to said blade unit, a rigid right angularly disposed centrally positioned handle or hand grip carried by said unit, a single slidable or reciprocable cutter unit slidably mounted on the guide means and having a handle arrangement, properly cushioned, which serves to slide the cutter unit back and forth and to bring the cutting blades into severing relation with the teeth on the blade unit. The difficulty with trimmers in this particular field is that they are comparatively heavy and it is generally necessary to hold the entire weight of the trimmer with one hand, say the left hand, and to grasp the other handle in the right hand and to thus reciprocate the cutter unit back and forth with considerable rapidity to attain wanted ends. To say the least, it is difficult in thus using such a trimmer to achieve the desired ends without tiring out quickly and without having the tool tend to turn in the left hand, only to cause irregular and gouging cuts. The principal object of the invention is to improve upon the above mentioned patent and others in the same line of endeavor by providing a flat plate which is of sufficient area that it constitutes a bed plate or adapter and is designed to rest on the ground, or directly on the parts of the bush being acted on in order to support the bulk of the weight and to permit the user to attain desired ends in a substantially tireless manner. Due to the fact that reciprocatory trimmers in this category work fast, compared to scissor type trimmers and cutters, they are highly desirable for use and what with the poise and balance attainable with my improved weight supporting adapter, I consider my improved trimmer a worthy contribution to this line of endeavor.

More specifically, in carrying out the principles of the present invention, I provide a multiple toothed cutter bar, mount a guide track rigidly on the main bar portion, provide a novel sliding shoe and slidably mount same on said track, said shoe carrying a double-edged cutter unit cooperable with the cutter teeth. A handle rod is connected to the shoe, provided with a hand grip and slidably guided and the significant factor is a suitably shaped and arranged plate mounted rigidly on the cutter bar and serving as the weight supporting adapter.

Other objects, structural features and advantages will become more readily apparent from the following description and the accompanying illustrative drawings.

In the drawings, wherein like numerals are employed to designate like parts throughout the views:

Figure 1 is a perspective view of a hedge trimmer constructed in accordance with the principles of the present invention.

Figure 2 is an enlarged section on the plane of the line 2—2 of Figure 1.

Figure 3 is an enlarged cross section on the line 3—3 of Figure 1, looking in the direction of the arrows.

Referring now to the drawings by distinguishing reference numerals and lead lines, the numeral 5 designates an essential unit of the overall assemblage which may be conveniently referred to as a cutter bar. This comprises a rigid metal or equivalent rectangular bar 6 provided along one edge with longitudinally spaced equidistant and suitably pointed teeth 7. The unit 5 is provided with relatively fixed guide means which takes the form of a guide track. The latter comprises a bottom strip 8 and a complemental wider strip 9 superimposed thereon with its longitudinal edges overhanging and projecting beyond the longitudinal edges of the strip 8. The strips 8 and 9 are fastened by screws or equivalent fastenings 10 to the bar 6. One of the screws is suitably lengthened and has the additional or third function of securing an L-shaped block 11 to one end, that is the left hand end, of the track. This block has an outstanding or lateral portion which is bifurcated and the furcations are denoted at 12 and provide a guide for a cylindrical rod 13 and also serve to pivotally mount a guide roller 14 in place. A relatively stationary handle 15 is provided and includes a shank portion 16 rigidly secured to the central area of said bar 6, on the edge opposite to the edge carrying the teeth 7. The shank is provided with a hand grip 17 of suitable size and shape. The adapter unit is denoted by the numeral 18 and as stated is in the nature of a bed plate, the same being flat and of appropriate dimensions and securely fastened to the underside of the bar 6. It extends out from the left hand edges of the bar 6 as shown in Figures 1 and 2 in a plane with the bottom surface of said bar, that is, the bottom as seen in the drawings.

Thus, the plate is of a length commensurate with the length of the unit 5 and it is preferably divided by a V-shaped notch 19 into duplicate wings 20. These wings, in practice, are placed upon and supported by the bush, hedge, or other surface being trimmed. If the tool is used for edging lawns, the adapter plate or unit 18 rests upon the ground, or walkway as the case may be. This obviously permits the bed plate to function as a sort of a "sled" and allows the device to be slid along the edge of the walkway while the trimming and cutting operation is being attended to. The same principle is achieved when the adapter plate is allowed to be brought to rest upon the top of a hedge. Manifestly, by thus distributing and supporting the load of the trimmer, it can be more successfully and nicely handled.

The third principal unit is the reciprocable cutter unit denoted by the numeral 21. This comprises a suitably shaped casting 22 (see Figures 1 and 2) said casting having an extension at one end as at 23 to accommodate bolts 24 and 25 with accompanying nuts 26 and 27 which serve to secure in place the double edged cutter blade 28.

The body portion of the shoe, denoted at 29, is provided with guide grooves 30 and 31 which are in parallelism and which serve to receive the edge portions of the track strip 9 and also serve to key the shoe to the track. A stabilizer 32 forms a part of the casting or shoe and this glides back and forth on the smooth surfaced bar 6. The numeral 33 designates a boss and 34 a set screw which is threaded in a screw threaded hole provided in the boss and is adapted to be fastened against the track strip 9 to lock the unit 21 against movement in relation to the other two units 5 and 18, when the trimmer is not in use. Reverting to the handle means for the cutter unit 21, this comprises the aforementioned rod 13, the same having a curved end 35 terminating in an eye 36 (see Figure 2) which is fastened on the shank of the bolt 24 as shown. Incidentally, the shoe is provided with upstanding lugs 36' which serve to receive the adjacent curved end 35 of the rod and said rod is provided at this end with a suitably anchored coiled spring 37 providing a cushioning element. There is a similar coiled cushioning spring 38 on the left hand end portion of the rod 13 as shown in Figure 1 also fitted on an irregularly curved portion of the rod which latter portion carries a hand grip 39. The latter end portion of the rod is operable between the guides or furcations 12 and its smooth operation is assisted by the idling pulley 14. It is obvious that the shoe 21, carrying the blade 28 and other accessories, slides freely back and forth and serves to position the blade so that it coacts with the teeth 7 to provide the desired sickle-bar-type cutting action.

In operation, the user grasps the hand grip 17 and brings the teeth 7 into relation with the tip ends to be severed and trimmed. Then, while thus holding the unit 5 steady, he catches hold of the hand grip 39 and pulls the rod 13 back and forth, causing the shoe and double cutter blade to come into effective cutting relation with the teeth 7. It follows that the twigs or other ends acted on are quickly and cleanly severed.

A careful consideration of the foregoing description in conjunction with the invention as illustrated in the drawings will enable the reader to obtain a clear understanding and impression of the alleged features of merit and novelty sufficient to clarify the construction of the invention as hereinafter claimed.

Minor changes in shape, size, materials and rearrangement of parts may be resorted to in actual practice so long as no departure is made from the invention as claimed.

Having described the invention, what is claimed as new is:

A hedge trimmer of the class shown and described comprising a relatively wide, flat elongated bed plate which is adapted to function as a support and rest and which is adapted for upholding a relatively heavy trimmer by transferring the weight of the trimmer to the plate and from the plate to a hedge or other support, and a hedge trimmer including a relatively stationary toothed cutter guard superimposed on and rigidly mounted along one marginal edge portion of said bed plate, a cutter slidable on said cutter guard and handle means for reciprocating the cutter, the major portion of said bed plate extending beyond the corresponding longitudinal edge of said cutter guard, said bed plate being centrally divided by a V-shaped notch, the vertex of the notch being in close proximity to an edge portion of the coacting cutter guard, said notch dividing said bed plate into duplicate relatively yieldable wing portions, said notch also serving for clearance purposes, and a handle rigidly attached to the intermediate portion of said cutter guard and extending at right angles from said cutter guard, said handle being in spaced registering relation in respect to said notch.

JEAN BAPTISTE ST. GERMAIN.

REFERENCES CITED

The following references are of record in the file of this patent:

UNITED STATES PATENTS

| Number | Name | Date |
| --- | --- | --- |
| 1,285,203 | Jaeger | Nov. 19, 1918 |
| 1,472,633 | Cordell | Oct. 30, 1923 |
| 1,714,778 | Hansen | May 28, 1929 |
| 1,778,995 | Beloin | Oct. 21, 1930 |
| 1,878,878 | Miller | Sept. 20, 1932 |
| 2,498,564 | Maxant | Feb. 21, 1950 |